US012171707B1

(12) United States Patent
Curley

(10) Patent No.: US 12,171,707 B1
(45) Date of Patent: Dec. 24, 2024

(54) ANTI-CELLULITE MASSAGE DEVICE

(71) Applicant: Charles Curley, Cortland, NY (US)

(72) Inventor: Charles Curley, Cortland, NY (US)

(*) Notice: Subject to any disclaimer, the term of this patent is extended or adjusted under 35 U.S.C. 154(b) by 0 days.

(21) Appl. No.: 18/443,575

(22) Filed: Feb. 16, 2024

(51) Int. Cl.
*A61H 15/00* (2006.01)
*A61H 7/00* (2006.01)

(52) U.S. Cl.
CPC ......... *A61H 15/0085* (2013.01); *A61H 7/007* (2013.01); *A61H 2015/0021* (2013.01); *A61H 2201/1215* (2013.01); *A61H 2201/1463* (2013.01); *A61H 2201/1692* (2013.01); *A61H 2207/00* (2013.01)

(58) Field of Classification Search
None
See application file for complete search history.

(56) References Cited

U.S. PATENT DOCUMENTS 2,003,272 A * 5/1935 Betz ................... A61H 15/0085 601/133
2,306,424 A * 12/1942 Betz ................... A61H 15/0085 601/119
4,729,368 A 3/1988 Guitay
5,215,078 A 6/1993 Fulop
5,665,053 A * 9/1997 Jacobs ................... A61H 7/008 601/123
5,685,827 A * 11/1997 Shimizu ............. A61H 15/0085 601/87
6,517,499 B1 2/2003 Pereira
7,147,611 B2 12/2006 Kassel
7,169,120 B2 1/2007 Murdock
7,634,314 B2 12/2009 Applebaum
7,699,794 B2 4/2010 Meyer
7,806,840 B2 10/2010 Chen
8,348,866 B2 * 1/2013 Tudico ................... A61H 7/008 601/7
9,295,607 B2 3/2016 Rosenberg
9,572,744 B2 * 2/2017 Giraud ............... A61H 15/0085
9,630,020 B2 * 4/2017 Missoli ..................... A61N 2/02
9,675,381 B2 * 6/2017 Hollinger ........... A61H 15/0085
10,004,658 B2 6/2018 Marty
10,143,617 B2 12/2018 Nelson
10,182,962 B2 1/2019 Godfrey
10,492,980 B2 12/2019 Giraud
(Continued)

*Primary Examiner* — Latoya M Louis
(74) *Attorney, Agent, or Firm* — Chris Tanner; BlueCollarIP.com

(57) ABSTRACT

A number of portable anti-cellulite massage devices are disclosed, where the devices are handheld and have four massage rollers which each rotate upon motor-driven eccentric axles to produce synchronized motion. All four rollers produce a percussive massage force in two orthogonal directions at their contact regions with the massage-receiving surface. Each roller has a gripping surface and a slip torque mechanism which allows the roller to partially slip upon its axle during its eccentric rotation cycle. Pairs of rollers rotate eccentrically in opposing directions to produce cyclic stretching and compression forces in the plane of the massage-receiving surface. In one operating mode, the devices produce alternating rising and collapsing skin folds while being traversed along the massage-receiving surface. In an alternate operating mode, the devices may be held stationary to treat a target fascial region by alternately raising a skin fold and then flattening it.

12 Claims, 17 Drawing Sheets

(56) References Cited

U.S. PATENT DOCUMENTS

| | | | | |
|---|---|---|---|---|
| 10,561,574 | B1 | 2/2020 | Marton | |
| 10,729,614 | B2 | 8/2020 | Marton | |
| 10,842,703 | B2 | 11/2020 | Zhang | |
| 10,881,577 | B2 | 1/2021 | Hashimoto | |
| 10,945,915 | B2 | 3/2021 | Wersland | |
| 10,959,908 | B2 | 3/2021 | Lee | |
| 11,083,666 | B2 | 8/2021 | Jeong | |
| 11,376,187 | B2 | 7/2022 | Zhao | |
| 11,478,397 | B1 | 10/2022 | Gonglach | |
| 11,497,676 | B2 | 11/2022 | Liu | |
| 11,559,462 | B2 | 1/2023 | Wersland | |
| 11,654,076 | B2 | 5/2023 | Cross | |
| 11,684,539 | B2 * | 6/2023 | Ferber | A61H 7/007 601/100 |
| 11,717,465 | B2 | 8/2023 | Nelson | |
| 11,779,510 | B2 * | 10/2023 | Li | A61H 1/00 601/94 |
| 11,883,357 | B2 * | 1/2024 | Godlieb | A61H 7/003 |
| 2006/0155224 | A1 * | 7/2006 | Calvert | A61H 23/0254 601/134 |
| 2011/0184324 | A1 * | 7/2011 | Wu | A61H 7/007 601/112 |
| 2015/0209219 | A1 * | 7/2015 | Hen | A61H 15/0078 601/118 |
| 2016/0175185 | A1 * | 6/2016 | Buchner Santos | A61H 23/006 601/113 |
| 2017/0065481 | A1 * | 3/2017 | Matsushita | A61H 15/0092 |
| 2018/0116903 | A1 * | 5/2018 | Matsushita | A61H 7/003 |
| 2018/0161233 | A1 * | 6/2018 | Nakanishi | A61N 1/322 |
| 2019/0117494 | A1 * | 4/2019 | Godlieb | A61H 7/004 |
| 2019/0133874 | A1 * | 5/2019 | Matsushita | A61H 7/007 |
| 2019/0262221 | A1 * | 8/2019 | Bailar | A61H 1/00 |
| 2020/0261306 | A1 | 8/2020 | Pepe | |
| 2022/0000706 | A1 * | 1/2022 | Grbic | A61H 15/00 |
| 2022/0160578 | A1 | 5/2022 | Curley | |
| 2023/0233401 | A1 | 7/2023 | Wu | |

* cited by examiner

ANTI-CELLULITE MASSAGE DEVICE

FIELD OF THE INVENTION

This invention relates to the field of massage devices that utilize rollers and/or vacuum to simulate the therapeutic massage techniques that are historically utilized by massage therapists.

BACKGROUND OF THE INVENTION

There exist many massage therapies and massage devices which have been designed to treat cellulite by rubbing, twisting, beating, stretching, compressing and rolling the upper superficial fatty layer that resides immediately underneath the skin. Three of the most common massage techniques are called 1) Myofascial Release, 2) Petrissage and 3) Tapotement (percussive massage). While these are techniques utilized by massage therapists, mechanized devices have been developed to simulate each of these techniques, thus alleviating the tiring manual tasks utilized by human massage therapists.

One simple type of massage therapy device simulates a technique called myofascial release, which is a form of soft tissue therapy intended to increase blood circulation, decompose fat cells, and relieve pain. Tightened muscle and tissue fibers are called "myofascial restrictions". Myofascial release therapy stretches and compresses the fascia to alleviate the restrictions, decompose fat cells and make the tissue fiber more flexible. FIG. 1 (Prior Art) illustrates the reciprocating motion of a therapist's hands while performing this type of massage. The fascial region between the two hands is compressed as the hands move together, and then stretched as the hands move apart, such that the massage-receiving region is cyclically compressed and stretched to relieve the restrictions.

Massage devices that simulate the Myofascial Release technique typically utilize balls or rollers that are traversed over the fascia regions to release the restrictions. FIG. 2 (Prior Art) is reproduced from U.S. Pat. No. 7,169,120, and illustrates a very simple massage device that utilizes a revolving ball to simulate myofascial release massage. This is called a "passive" massage device because the reciprocating motion is provided by the user, who grasps the device 1090 by handle 1098 and drags the device along the massage-receiving surface with a reciprocating motion. As shown in FIG. 3 (Prior Art), the ball 1096 produces a traveling wave in front of its path as it is pushed along the surface by the user. That region of the fascia is compressed, while the region of fascia that trails the ball is stretched. As the user reciprocates the ball along the massage-receiving surface, the fascial regions surrounding the ball experience alternating modes of compression and stretching as the traversing direction is changed.

Another myofascial massage device is taught by US Patent application US2023/0233401 A1, which is a motorized massage device which utilizes multiple spherical "heads". FIG. 4 (Prior Art) illustrates a three-dimensional assembly of that device as reproduced from that disclosure. The device consists of two rotatable shafts 1120 and 1124 which are fixed to frame 1111 and rotated by the motion of an eccentric 1121. Mounted to each fixed shaft 1120 and 1124 are four spherical "heads" that rotate about shafts 1120 and 1124 through a small arc in reciprocating manner. The spherical heads 1125 are affixed so as to not rotate upon their supports.

FIG. 5 (Prior Art) is a side elevational view of device 1110 as reproduced from that patent which illustrates its operation. The spherical heads 1125 reciprocate through a small angle to produce a lateral back and forth motion relative to the massage-receiving surface. This view illustrates the position of the spherical heads 1125 when at their closet position in the rotation of the eccentric driver 1121, and the arrows indicate the motion as they move together. This motion induces a compressed region of fascia (section view diagonals) which is located between the two rows of heads 1125. As the heads reverse and move away from each other, that fascia region is then stretched along the massage-receiving surface. The reciprocating motion thus alternately compresses and stretches the fascia region between the two rows of spherical heads, producing myofascial massage.

A second massage technique that is said to treat cellulite is called Tapotement, which is merely the rapid and repeated striking of the fascia. This technique is commonly known as "percussive massage" in laymen's terms. FIG. 6 (Prior Art) illustrates the hand movement of a massage therapist when performing one exemplary type of percussive massage. In this illustration, the fingers are extended. In other percussive massage variations the fingers are folded inward to form a fist.

Mechanical devices that simulate percussive massage are commonly called "massage guns" or "fascia guns". These devices use a reciprocating plunger to impart percussive forces against a target area of the fascia, and are said to be effective for treatment of the deeper fascia and muscle tissue. Many such devices have been patented and commercialized, and some have been marketed as "Anti-Cellulite Massagers". An example of a battery powered massage gun configuration is shown in the illustration of FIG. 7 (Prior Art) which is similar to the configurations described in several prior art utility patents.

Referring to FIG. 7 (Prior Art), a massage gun 900 has a percussive massage head 905 with a spherical shape which is mounted on the end of a piston 906 that reciprocates in the direction of the axis of the arrow 904 within the housing 902 to create a reciprocating plunging movement of the head 905. The main housing 901 has a cylindrical extension 903 which houses a battery-driven motor. The cylindrical battery assembly 918 has the dual functions of housing the battery and also acting as the handle for the massage gun 900. The user grips the cylindrical extension 918 in a way similar to grasping a pistol, and then presses the massage head 905 against the target muscle or tissue of the human body. The reciprocating head motion is initiated by engaging an "ON" switch. This type of massage device produces only up and down reciprocating motion of the massage head 905. Additionally, the person holding these devices experiences a "reactionary bounce" which causes difficulty in holding the device steady over a chosen muscle target.

The effectiveness of the massage gun depends upon the user's ability to hold the gun steady while applying pressure to the target fascia location. The percussive action of the reciprocating head causes an equal and opposite reaction at the user's hand, which makes it difficult to hold the gun focused at the target location, especially at low oscillation speeds. The reaction on the user also causes fatigue when attempting to focus the gun in a specific location for a sustained period of time.

The device shown in FIG. 8 (Prior Art) is another type of massage gun which facilitates lateral movement of the percussive head while stabilizing the massage device to facilitate rolling, traversing motions. US patent application 2022/0160578 teaches a massage device with rollers that may be traversed along the massage-receiving surface in the direction shown by arrow 1244. The device possesses two stabilizing rollers 1220 and 1230 which freely rotate upon axle 1211. A third roller 1224 is mounted on a motor-driven piston that pulsates bidirectionally with an up and down reciprocating motion along a single vector indicated by arrow 1248. The roller 1224 also rotates freely upon axle 1240 as the user traverses the assembly 1200 along the massage-receiving surface. The axles 1240 and 1211 are fixed to the device in a direction that is orthogonal to the direction 1244. The stabilizing rollers 1220 and 1230 act to relieve the "reactionary bounce" problem encountered by the user in holding a conventional massage gun steady. However, none of the rollers 1220, 1230, or 1224 induce opposing forces in a direction parallel to the massage-receiving surface to stretch and compress the fascia.

Petrissage is a third type of massage technique used for the treatment of cellulite, and is sometimes called the palpate-roll technique. This technique utilizes repetitious skin rolling and kneading. Skin rolling is a technique whereby the therapist pinches the fascia and rolls the pinched region along the surface. Kneading is the process of repetitiously pinching and then releasing the skin fold. FIG. 9 (Prior Art) demonstrates the hand motion of a therapist utilizing Petrissage to create a skin fold.

There exist many patents of mechanized devices that simulate petrissage techniques, and most of them use vacuum to create the skin fold by raising a small section of fascia above the surrounding fascia surface. U.S. Pat. No. 5,665,053 teaches a vacuum device which utilizes a vacuum pump and two rollers to perform Petrissage massage. FIG. 10 (Prior Art) is reproduced from that patent and illustrates the affect of the vacuum 1325 in creating a skin fold. This is a passive device 1310 that is dragged along the massage-receiving surface by the user as the vacuum source is applied to the chamber 1324. As the skin fold is raised by the vacuum, the two rollers 1326A and 1326B are mounted in slots which allow the vacuum to pull them closer together, thus assisting in holding the skin fold in the elevated position. The two rollers 1323 and 1327 roll in the same direction as the user moves the device in the direction shown. This patent explains that the skin fold consists of four layers including the skin 1312, the superficial fatty layer 1314, the fascia superficialis 1316, and the deep fatty layer 1318. The device is incapable of producing the reciprocating compression and stretching cycle that is induced by the myofascial release technique. Nor can the device produce percussive massage forces.

Another massage device that utilizes the Petrissage method is taught by U.S. Pat. No. 4,729,368. FIG. 11 (Prior Art) is reproduced from that disclosure and illustrates a handheld device 1400 that is attached to a vacuum pump which provides suction in the direction indicated by the arrow via an umbilical tube 1421. The suction creates a skin fold in the region between the two rollers 1403 and 1404. The device has a motor (not shown) that is used to power the two rollers 1403 and 1404 in order to propel the device along the massage-receiving surface while the vacuum lifts the fascia so as to create a traversing skin fold. The rollers 1403 and 1404 rotate in the same direction and are journaled in slots 1452 and 1453, such that the vacuum pulls them closer together to the position indicated by the dashed line circles. Springs (not shown) return the two rollers to their separated position (solid circles) when the vacuum pump is turned off. A switch on the handle 1402 of the device 1400 allows the operator to reverse the direction along which the device is propelled by rollers 1403 and 1404. This device is incapable of applying percussive massage or applying alternating stretching and compression of the fascia surface.

Another Petrissage device which cyclically pinches and collapses skin folds (kneading) is explained in U.S. Pat. No. 9,295,607 B2. FIG. 12 (Prior Art) is reproduced from that disclosure and illustrates a device having two vacuum chambers 1504 and 1524 which are alternately activated as the device is dragged along the message-receiving surface by the user. This device is said to treat cellulite by breaking down sub-dermal (under the skin) fat cells, thus lessening the amount of sub-dermal fat, tightening loose skin, tightening and firming body surface, and reducing wrinkles in the skin. The skin is represented by label 1516 and the sub-dermal fat is represented by label 1520 in the diagram.

As the device in FIG. 12 (Prior Art) is traversed along the surface of the skin in the direction of arrow 1552, vacuum 1570 is applied to a first vacuum chamber 1524 which creates a skin fold as indicated by the bulge 1528. Simultaneously, positive air pressure is pumped into chamber 1504, as indicated by arrow 1560, forcing the previously formed protrusion 1518 out of the adjacent vacuum chamber 1504 to flatten the skin fold. Considering what is experienced by a single fascial region along the tissue 1516, it experiences a cycle of raised protrusion (compression) and then flattening as the device passes by. This device is expensive to manufacture as it requires a vacuum pump to generate vacuum, a compressor to generate the positive air pressure, umbilical tubes, a series of coordinating solenoid valves and an associated remotely located electronic controller. Additionally, the device is incapable of producing percussive massage forces on the fascia in a downward direction.

SUMMARY OF THE EMBODIMENTS

The unique massage device being disclosed herein is designed to provide massage by collectively automating three types of massage techniques which are normally utilized by massage therapists, including 1) Myofascial Release, 2) Tapotement (percussive massage) and 3) Petrissage. These three techniques have been described in the prior art to treat cellulite (decompose fat cells), increase blood flow, decrease muscle stiffness, repair muscle tissue, reduce joint inflammation, for pain relief, and for increasing the flexibility of the fascial layers.

The Anti-cellulite Massage Device comprises a handheld, portable massage device with four massage rollers which each rotate upon motor-driven eccentric axles to produce synchronized motion. All four rollers produce a percussive massage force in two orthogonal directions at their contact regions with the massage-receiving surface. Each roller has a gripping surface and a slip torque means which allows the roller to partially slip upon its axle during its eccentric rotation cycle. Pairs of rollers rotate eccentrically in opposing directions to produce cyclic stretching and compression forces in the plane of the massage-receiving surface. In one operating mode, the device produces alternating rising and collapsing skin folds while being traversed along the massage-receiving surface. In an alternate mode, the device may be held stationary to treat a target fascial region by alternately raising a skin fold and then flattening it. Percussive massage forces are created in both modes The device is compact and relatively simple to manufacture in comparison to the prior art devices that require vacuum pumps, valves, umbilical apparatuses, vacuum seals and remotely located control stations. The handheld device is completely portable and light weight, being powered by a small DC motor which receives its power from onboard rechargeable batteries and cooperates with onboard activation and speed controls means. Treatments with this device do not require lubricants and can be made by the user in their own home without reliance upon a massage therapist. The configuration and operation of the device will be better understood from the illustrated figures and descriptions that follow.

DETAILED DESCRIPTION

Figure 13:
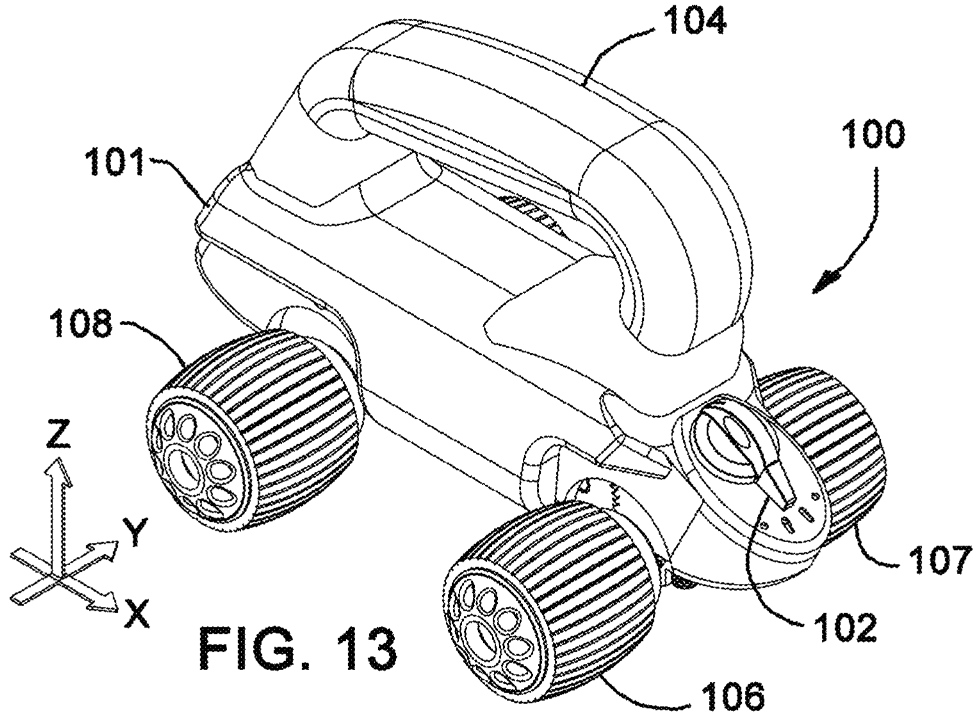
FIG. 13 is a right frontal isometric view of the massage device being described as the first embodiment of the current invention.

FIG. 13 illustrates a preferred embodiment of the Anti-Cellulite Massage Device disclosed herein which includes four massage rollers which are rotatably mounted on eccentric axles which cause the rollers to rotate in a coordinated eccentric fashion as shown in FIG. 13. The device 100 consists of a casing body 101 which includes a handle portion 104. The front rollers 106 and 107 are rotatable upon a first eccentric axle (the front axle) and the rear rollers 108 and 109 (not shown) are rotatable upon second eccentric axle, which is designated herein as the rear eccentric axle. Each of the two axles are rotationally driven by a battery-powered motor 130. The speed of the eccentric axle motion is controlled by the velocity of a battery-powered drive motor 130 which is mounted internally within the casing 101. The operator controls the motor speed by setting the position of the speed control knob 102. The reference axes X, Y, and Z are shown to orient the vectors showing the multiple directions of the massage forces as further explained below.

In general, an operator grasps the device 100 by the handle portion 104 and exerts pressure along the negative Z axis. The operator may use the device 100 in two different modes. In the first mode, the operator may hold the device stationary over a target region. Alternately, in a second operational mode, the device 100 may be freely traversed back and forth along the X-axis of the massage receiving regions. In either mode, bidirectional pulsating percussive forces are induced along two orthogonal directions at the contact region under each massage roller. In addition, stretching and compression of the fascia is induced along the direction of the X-axis which is specified as the "stretching axis" herein.

The second operational mode is called the "freely traversable" mode. In the context of this disclosure, the term "freely traversable" means that the device can be traversed along the massage-receiving surface while inducing two-dimensional pulsations at each roller contact, and without causing any massage roller to skid along the massage-receiving surface.

Figure 14:
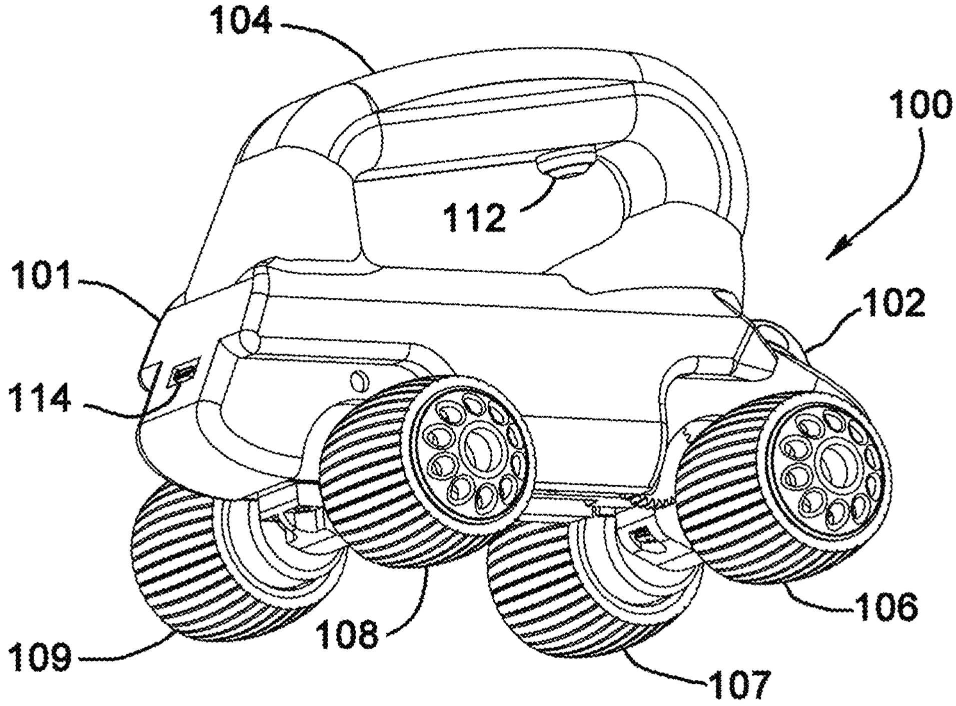
FIG. 14 is a rear underside isometric view of the massage device being described as the first embodiment of current invention.

FIG. 14 is a rear lower isometric view of the massage device 100 which shows the front eccentric rollers 106 and 107, in addition to the rear eccentric rollers 108 and 109. A trigger button 112 is shown on the underside of the handle portion 104. The trigger button 112 is used by the operator to actuate the motor-driven eccentric axles, where the term "motor-driven" means that the axles are rotationally powered by the motor. Speed control knob 102 is adjustable by the operator to control the rotational velocity of the eccentric axles which induce synchronized eccentric rotation of the rollers mounted thereon. Charging port 114 is used to charge the internal batteries which power the motor.

Figure 15:
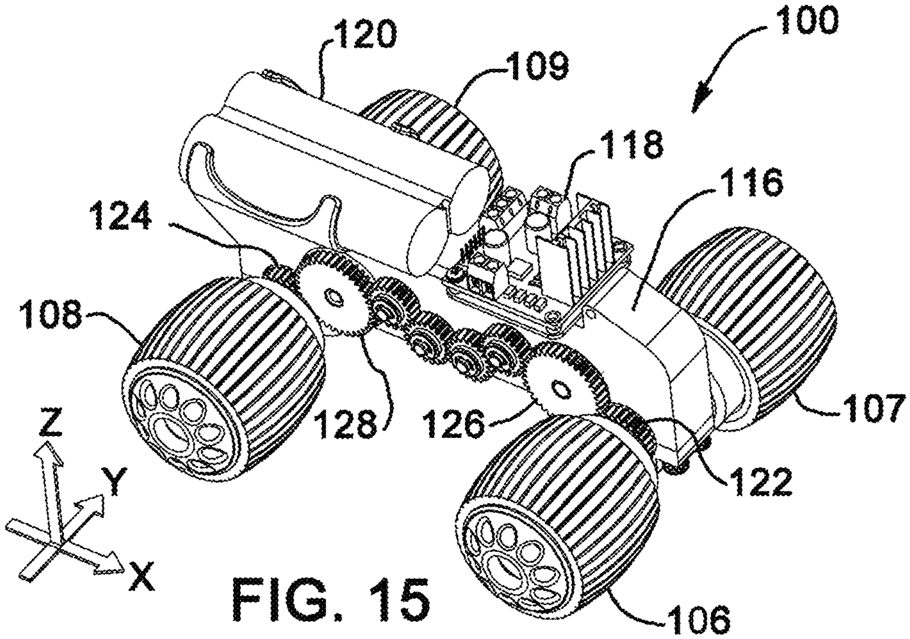
FIG. 15 is a right frontal isometric view of the massage device of the first embodiment with the outer casing removed.

FIG. 15 is a front isometric view of the massage device 100 with the outer casing removed in order to show the arrangement of the internal components which are attached to the main frame 116. This view is looking at the right side of the device 100. A pair of batteries 120 is shown attached to the frame 116 just rearward of an electronic assembly 118 which possesses the motor control and battery charging circuitry. The batteries could be of the NICAD, lithium ion, sodium ion or other known battery types. The front eccentric rollers 106 and 107 are rotated through circular orbits by pinion 122 which is rotated by gear 126. Rear eccentric rollers 108 and 109 are rotated through circular orbits by gear 128 which rotates pinion 124.

Figure 16:
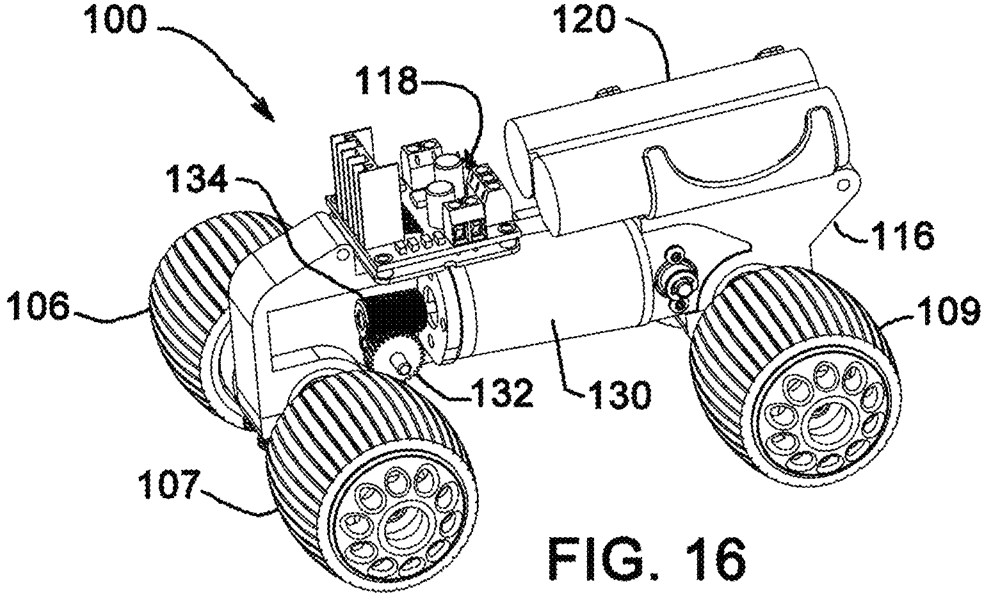
FIG. 16 is a left frontal isometric view of the massage device of the first embodiment with the outer casing removed.

FIG. 16 is a front left isometric view of the massage device 100 with the outer casing removed and shows the left side of the device 100, which is the side opposite of the gear train shown in FIG. 15. This figure shows the position of the drive motor 130. The worm pinion 134 is attached to the motor drive shaft and rotates worm gear 132. The worm gear 132 is attached to the gear 126 (FIG. 15) via a cross shaft (not shown), such that the motor 130 drives the gear train shown in FIG. 15 while the trigger button 112 is compressed.

Figure 17:
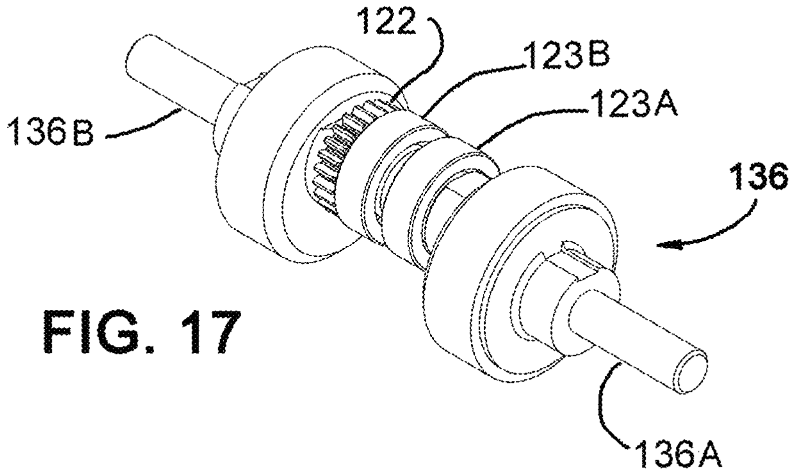
FIG. 17 is an isometric view of one eccentric axle of the first embodiment showing the axle extensions.

FIG. 17 shows an isometric view of the front eccentric axle assembly 136, which rotates within bearings 123A and 123B, as rotated by pinion 122 which is fixedly attached to the axle assembly 136. Each peripheral end of the axle assembly 136 possesses an eccentric shaft extension 136A and 136B.

Figure 18:
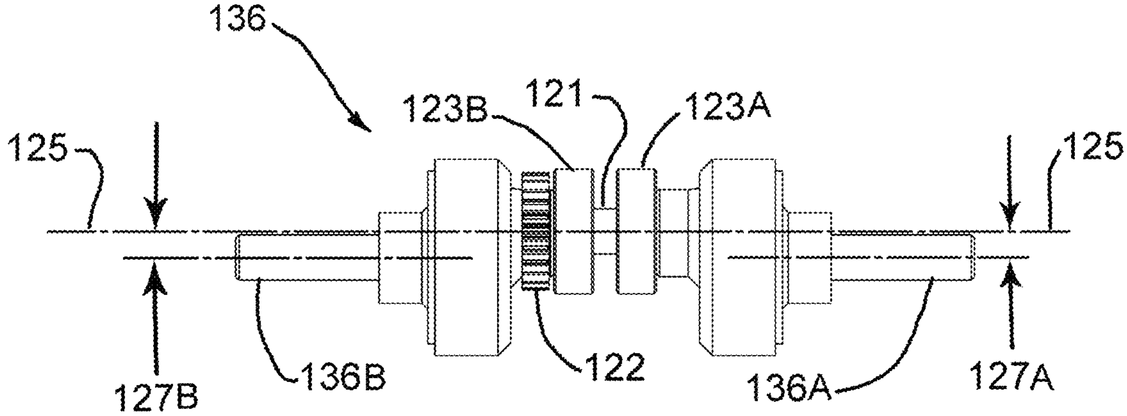
FIG. 18 is a frontal view of one eccentric axle of the first embodiment showing the eccentric offsets of the right and left axles.

FIG. 18 is a frontal view of the axle showing its rotation axis 125 and the bearings 123A and 123B. The entire axle assembly 136 rotates about axis 125. Eccentric axle extension 136A is offset from the rotation axis by a dimension 127A, where the dimension 127A is normally designated as the eccentricity (e) in many engineering texts. In like manner, eccentric axle extension 136B is offset from the rotation axis by a dimension 127B. Eccentricity dimensions 127A and 127B are equal in the preferred embodiment, but may be made unequal in alternate embodiments.

Figure 19:
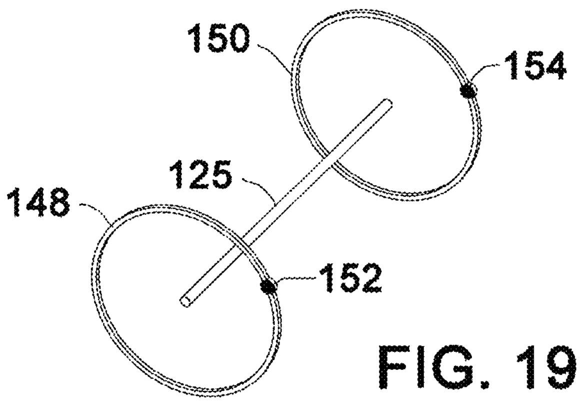
FIG. 19 is a diagram explaining the phase relationship between the right and left axle tips according to the axle configuration of FIG. 18.

FIG. 19 is a diagram explaining the phase relationship between the right and left eccentric axle extensions according to the axle configuration of FIG. 18. The wire represents the rotational axis 125 of the axle as shown in in FIG. 18, while the circles 148 and 150 represent the circular paths (exaggerated) of the axle extremities. Circle 148 represents the loci of the path of a right eccentric axle extension orbit, while circle 150 represents the orbital path of the left axle extension. Label 152 indicates the position of a right axle tip along circular orbit at any given point in time, while 154 represents that of a left axle tip. In this example, the right axle tip 152 is at its 2 o'clock position while the left axle tip 154 is also it its 2 o'clock position. The rotation of the two axle extensions is said to be "in phase" because they both reside at identical angular orientations along their circular orbits at any given instant in time.

Figure 20:
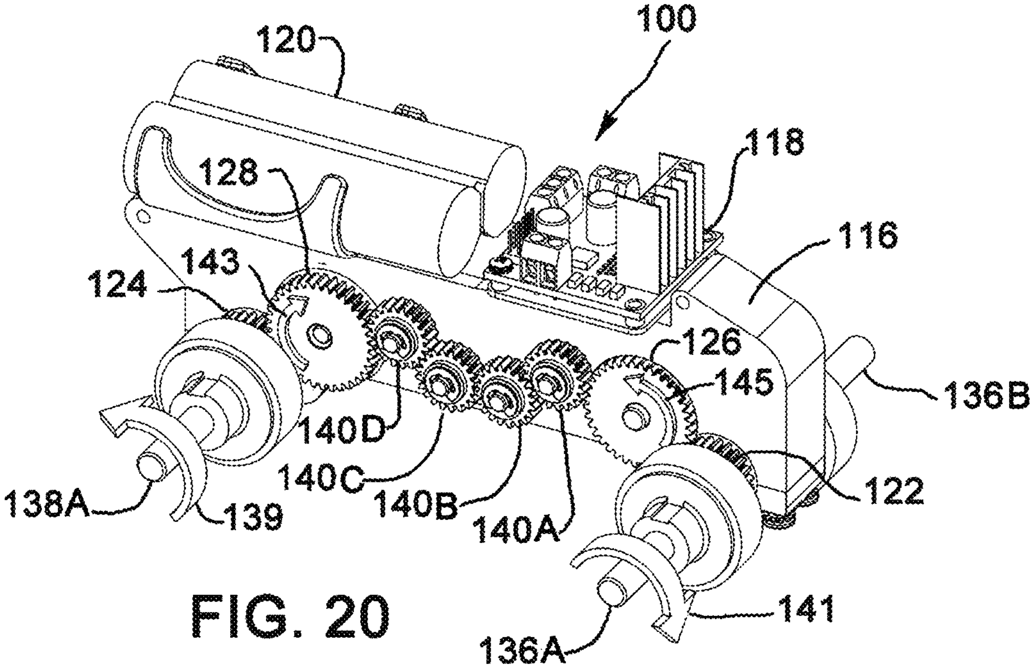
FIG. 20 is a front isometric view of the eccentric massage device of the first embodiment with the outer casing removed.

FIG. 20 is a right frontal isometric view of the massage device 100 with the outer casing removed in order to show the driving arrangement of the gears and axles which are attached to the main frame 116. Front axle drive gear 126 is rotating counterclockwise as shown by arrow 145. Pinion 122 therefore causes the eccentric axle extension 136A to rotate clockwise in a circular orbit as shown by arrow 141. Four synchronizing pinions are shown as 140A, 140B, 140C and 140D. These synchronizing pinions induce rear axle drive gear 128 to rotate clockwise as shown by arrow 143. The clockwise rotation of gear 128 as shown by arrow 143 causes the rear axle drive pinion 124 to rotate the rear eccentric axle extension 138A counter clockwise as shown by arrow 139. The front eccentric axle 136A and the rear eccentric axle 138A therefore counter-rotate synchronously at the same velocity as indicated by the arrows 141 and 139. One cycle is defined as one full revolution of pinion 122 and pinon 124. One of ordinary skill understands that a timing belt could be substituted for some of the gear train components for the purpose of providing synchronization.

Figure 21:
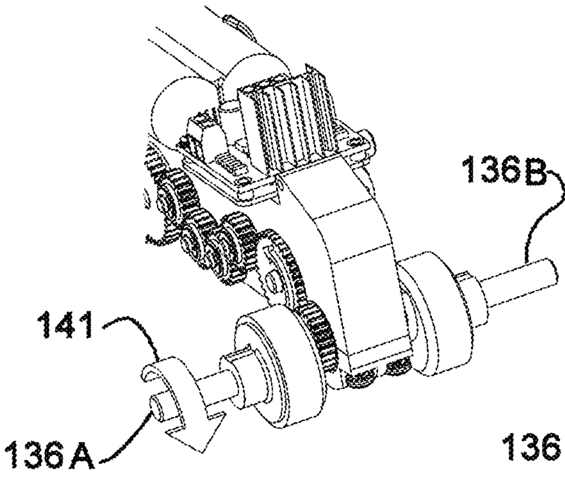
FIG. 21 is an isometric view of the front eccentric axle of the first embodiment showing the tips of the axles at rotational positions designated as 6 o'clock.
Figure 22:
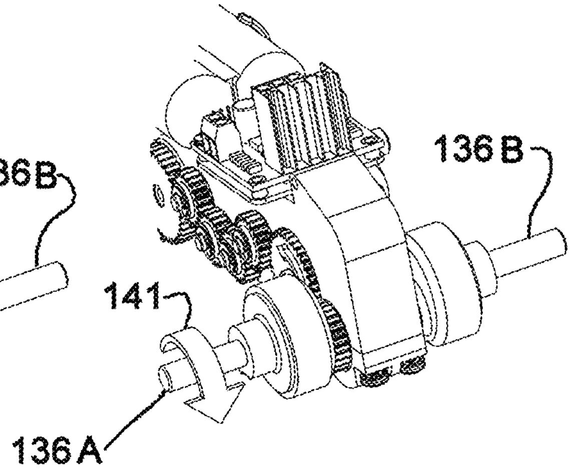
FIG. 22 is an isometric view of the front eccentric axle of the first embodiment showing the tips of the axles at rotational positions designated as 12 o'clock.

FIG. 21 is a partial front isometric view of the massage device shown in FIG. 20, showing the front axle assembly rotated to its 6 o'clock position (see FIG. 19). FIG. 22 is the same view of device 100, but showing the font axle assembly rotated to its 12 o'clock position.

Figure 23:
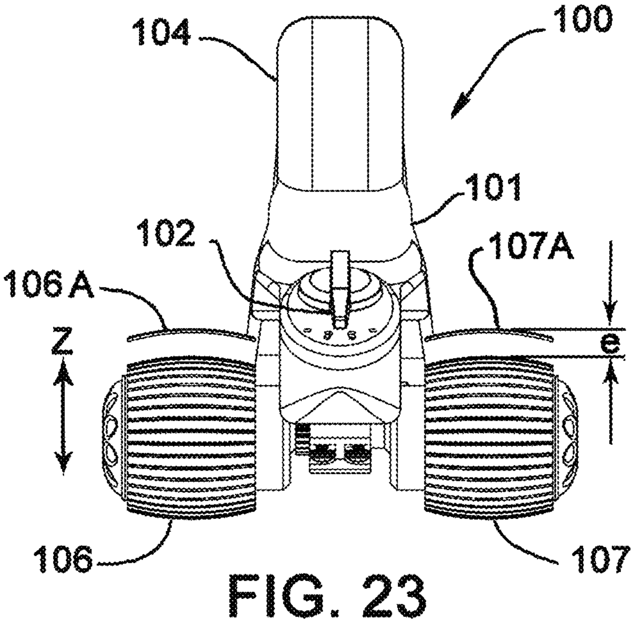
FIG. 23 is frontal view of the of the first embodiment showing the extreme positions of the of the front rollers at rotational positions designated as 6 o'clock and 12 o'clock.

FIG. 23 is a front view of the massage device 100 showing the extreme position of the front rollers 106 and 107 when rotated between their 6 o'clock and 12 o'clock positions. The rollers are shown in full outline at their 6 o'clock position. The arc 106A and arc 107A represent the extreme periphery of the rollers at the 12 o'clock position such that observer can understand the displacement along the Z-axis. That displacement is represented by the eccentricity e shown in FIG. 23.

Figure 24:
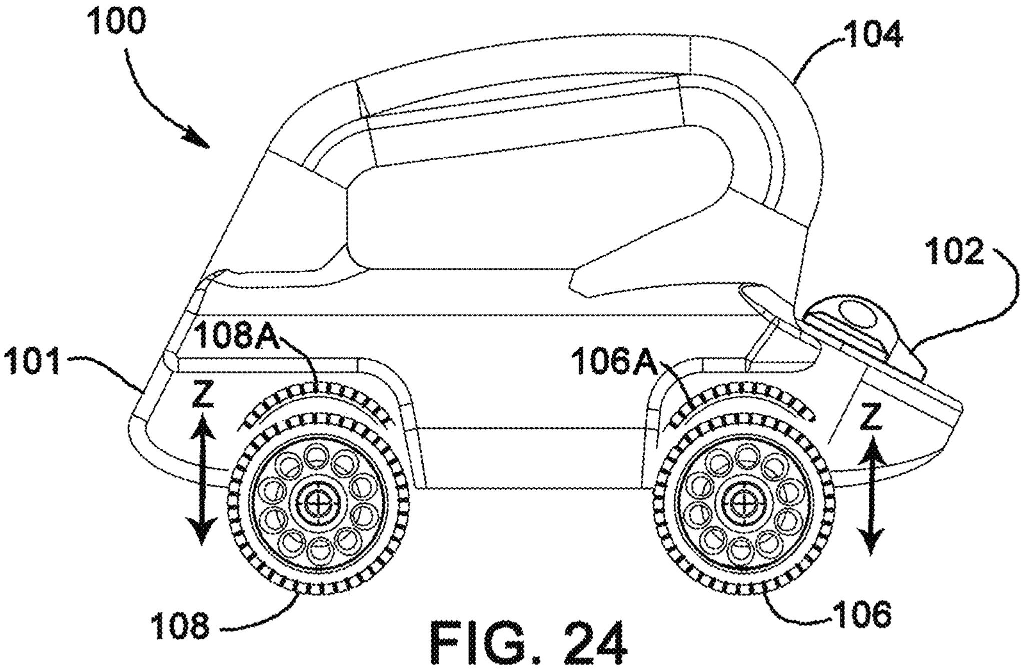
FIG. 24 is side view of the of the first embodiment showing the extreme positions of the of the front and rear rollers at rotational positions designated as 6 o'clock and 12 o'clock.

The relative Z-axis movement is again illustrated in the side elevation view of FIG. 24. In that figure, a section of roller 108 is shown as 108A in its extreme elevation for the rear roller. Likewise, the extreme elevational displacement of roller 106 is shown by a partial section 106A. The movement range in this Z-axis direction constitutes the percussive force component produced by this massage device.

Figure 25:
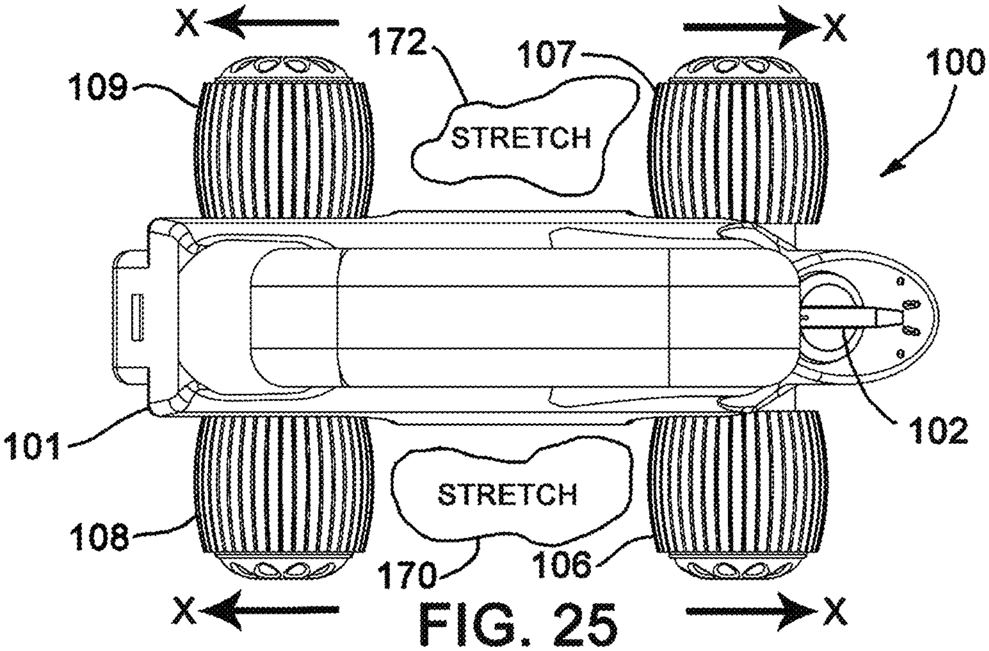
FIG. 25 is a top view of the first embodiment showing the front rollers having moved apart from the rear rollers along the X-axis.

FIG. 25 is a top view of the massage device 100 showing the front and rear eccentrically-mounted rollers at their relative extreme positions along the x-axis within the synchronous rotation cycle. The front roller 106 is at its 3 o'clock position while the rear roller 108 is at its 9 o'clock position. Likewise, the left front roller 107 is at its 3 o'clock position while the left rear roller 109 is at its 9 o'clock position.

The label "STRETCH" in FIG. 25 is used to indicate that the massage-receiving fascia within the region 172 between the roller 109 and 107 tends to be stretched by the opposing separating motion of those two rollers along the X-axis. The region between roller 106 and roller 108 is also synchronously stretched as indicated by the region labeled 170. As explained in reference to FIG. 13, the X-axis corresponds to the "stretch axis" along the surface of the fascia.

Figure 26:
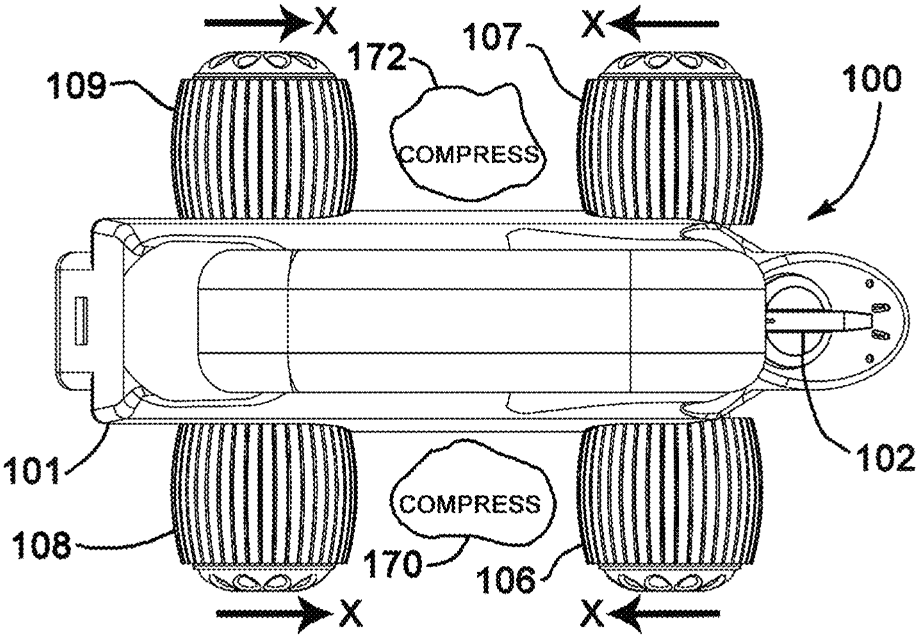
FIG. 26 is a top view of the first embodiment showing the front rollers and rear rollers having moved closer to each other along the X-axis.

FIG. 26 illustrates the front and rear rollers having rotated along their eccentric orbits 180 degrees (½ cycle) past the positions shown in FIG. 25. During that half cycle movement from FIG. 25 to FIG. 26, the front and rear rollers are moved closer together along the X-axis. The label "COMPRESS" in FIG. 26 is used to indicate that the massage-receiving fascia within the region 172 between the roller 109 and 107 becomes compressed as the front and rear rollers move toward each other along the X-axis. Rollers 106 and 108 simultaneously compress the region 170 on the right side of the device 100.

Figure 1:
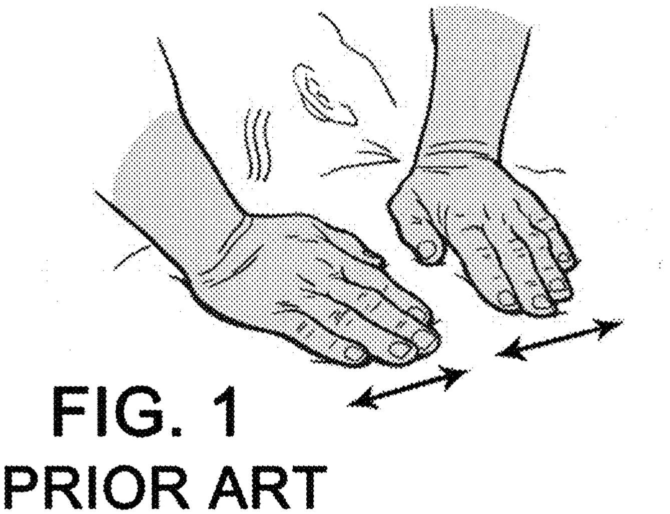
FIG. 1 PRIOR ART
FIG. 1 (Prior Art) is an illustration of the hand movement utilized by a massage therapist while implementing the Myofascial Release technique.
Figure 2:
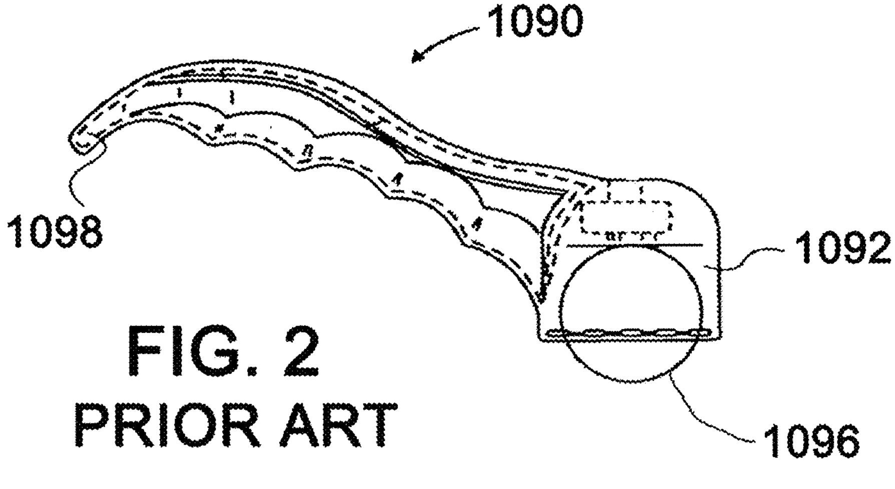
FIG. 2 PRIOR ART
FIG. 2 (Prior Art) is an illustration of a prior art device which is utilized to implement the Myofascial Release technique.
Figure 3:
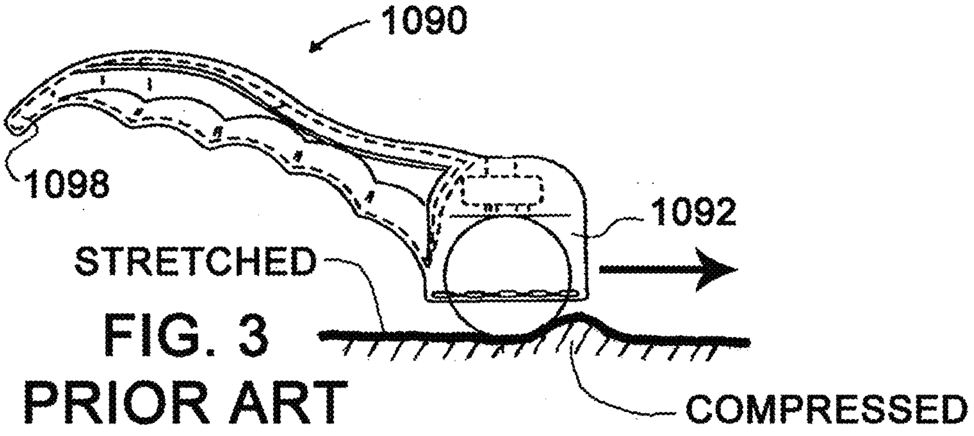
FIG. 3 PRIOR ART
FIG. 3 (Prior Art) is an illustration of the operation of the massage device described in FIG. 2.
Figure 4:
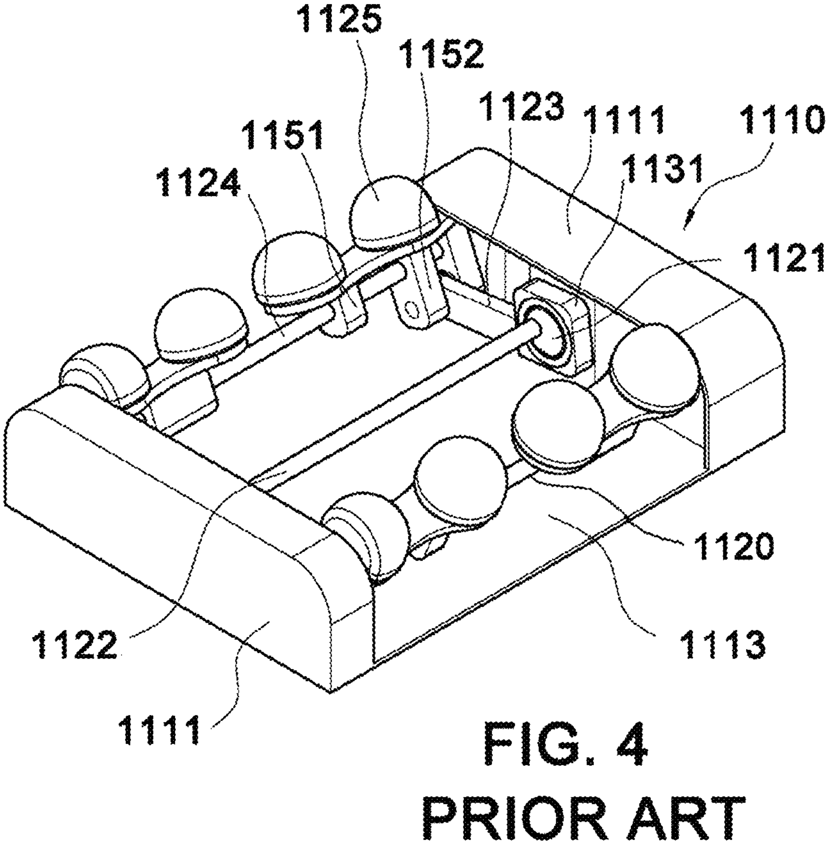
FIG. 4 PRIOR ART
FIG. 4 (Prior Art) is an isometric view of another prior art massage device which is utilized to implement the Myofascial Release technique.
Figure 5:
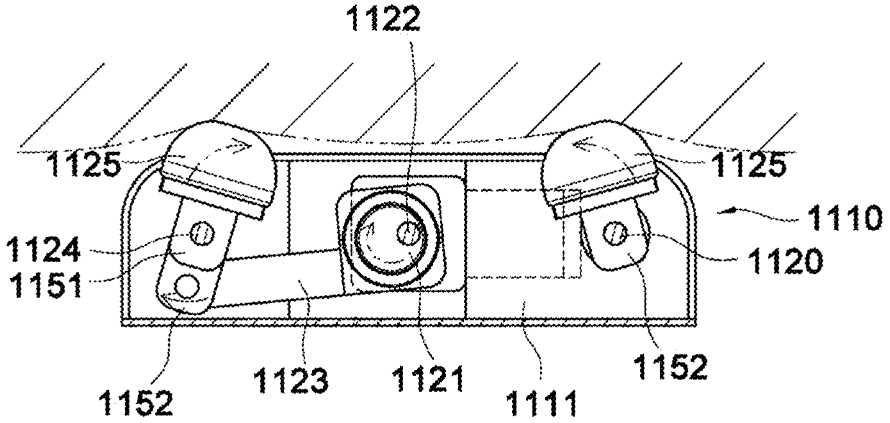
FIG. 5 PRIOR ART
FIG. 5 (Prior Art) is a side elevational view of the prior art massage device shown in FIG. 4.
Figure 6:
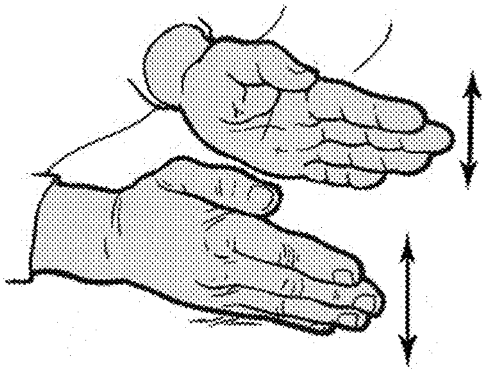
FIG. 6 PRIOR ART
FIG. 6 (Prior Art) is an illustration of a hand movement utilized by a massage therapist while implementing the Tapotement (percussive massage) technique.
Figure 7:
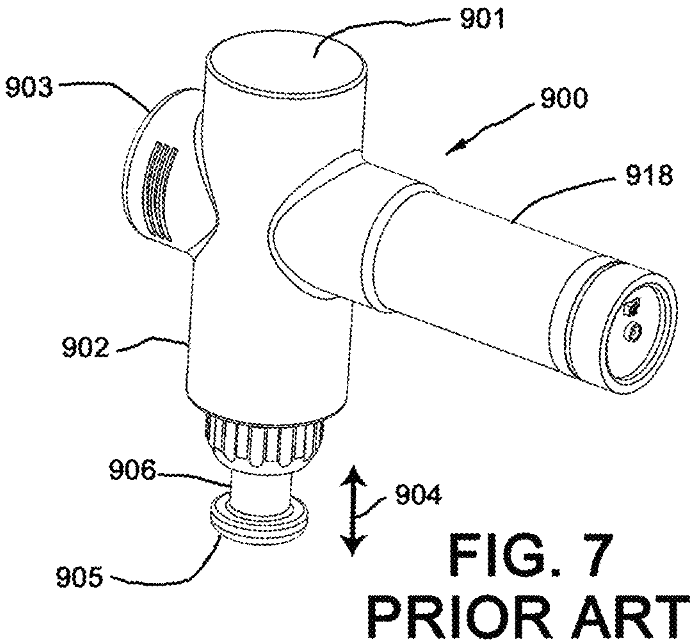
FIG. 7 PRIOR ART
FIG. 7 (Prior Art) is an illustration of a prior art massage device which is utilized to implement percussive massage.
Figure 8:
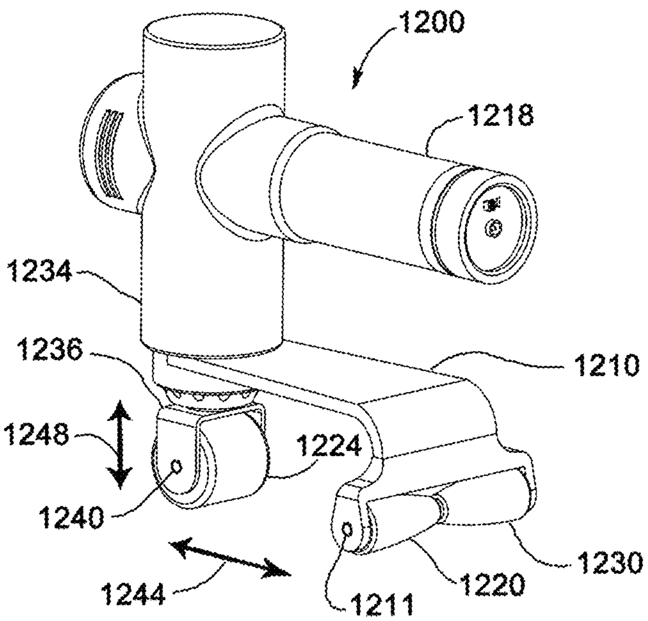
FIG. 8 PRIOR ART
FIG. 8 (Prior Art) is an isometric view of another prior art massage device that is utilized to implement percussive massage.
Figure 9:
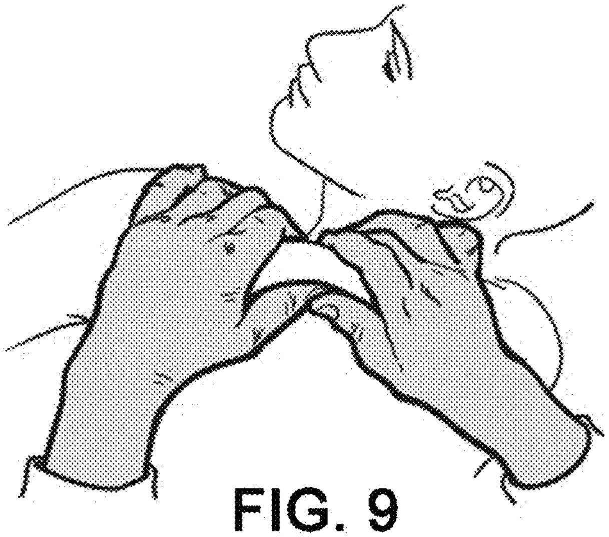
FIG. 9 PRIOR ART
FIG. 9 (Prior Art) is an illustration of a hand movement utilized by a massage therapist while implementing the Petrissage technique.
Figure 10:
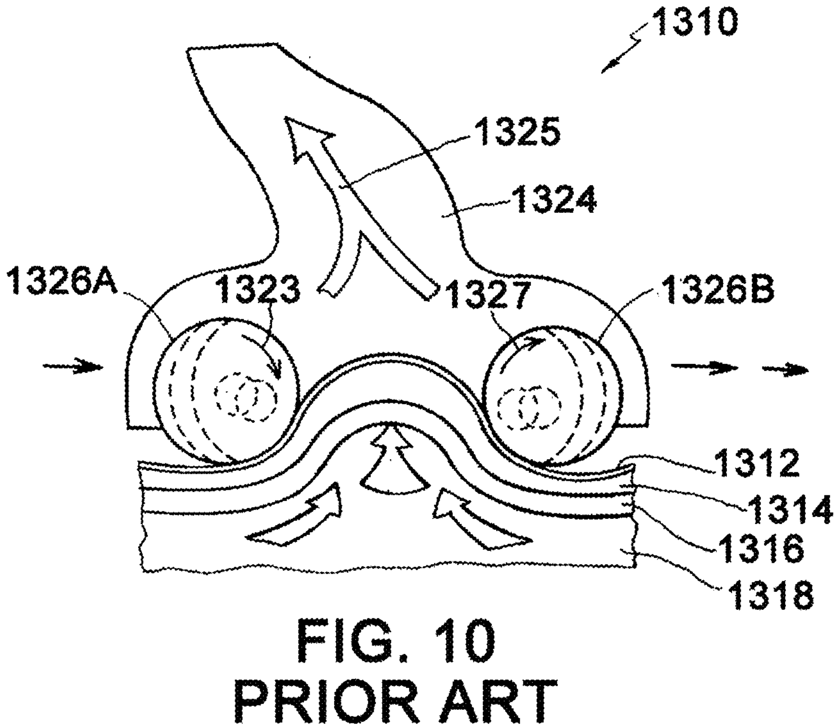
FIG. 10 PRIOR ART
FIG. 10 (Prior Art) is an illustration of a prior art massage device which is utilized to implement the Petrissage technique.
Figure 11:
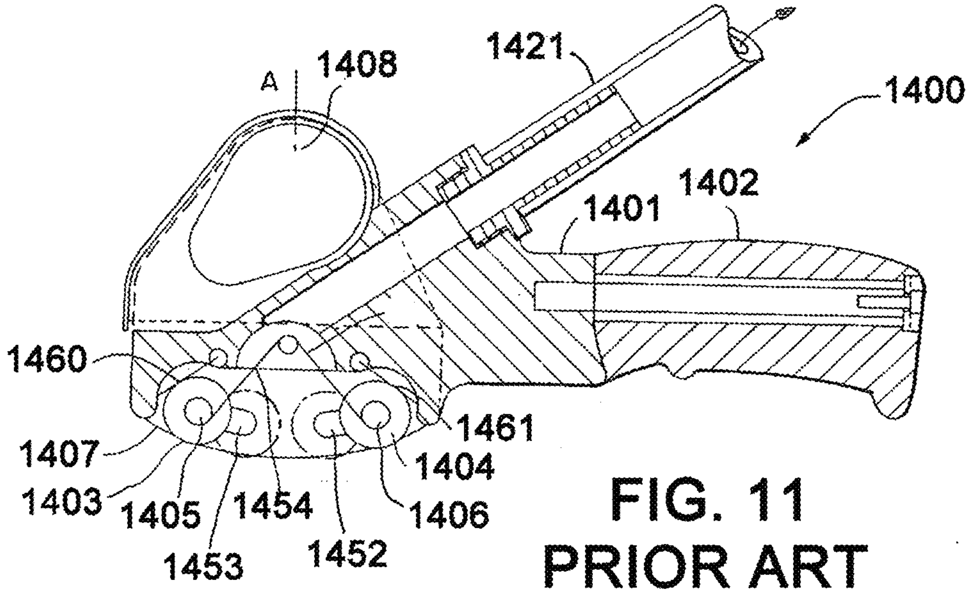
FIG. 11 PRIOR ART
FIG. 11 (Prior Art) is a side elevational section view of another prior art massage device that is utilized to implement the Petrissage technique.
Figure 12:
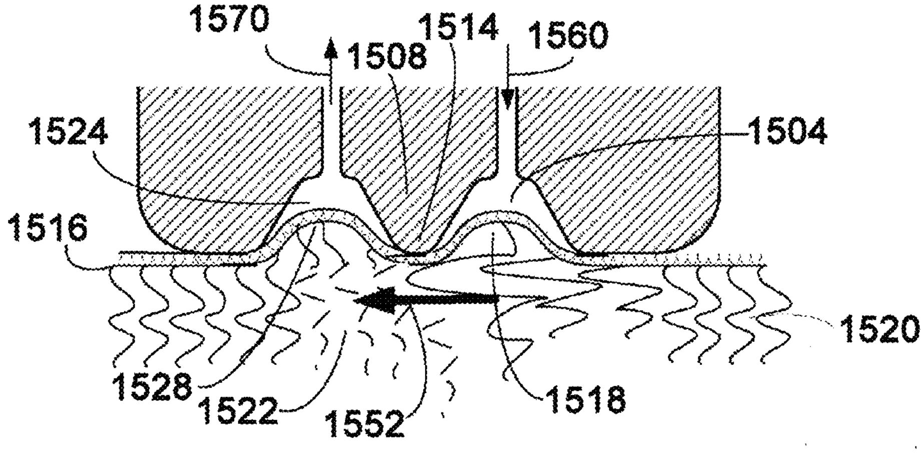
FIG 12 PRIOR ART
FIG. 12 (Prior Art) is a side elevational section view of another prior art massage device that utilizes dual vacuum chambers to implement the Petrissage technique.
Figure 27:
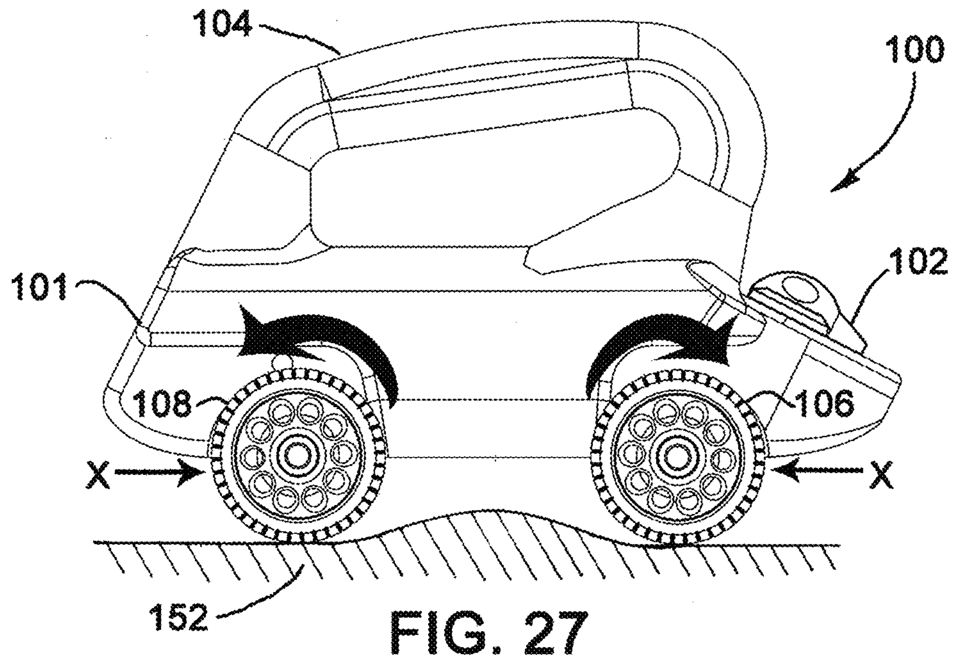
FIG. 27 is a side view of the first embodiment showing the front rollers and rear rollers having moved closer to each other to create the skin fold during the first half-cycle.
Figure 28:
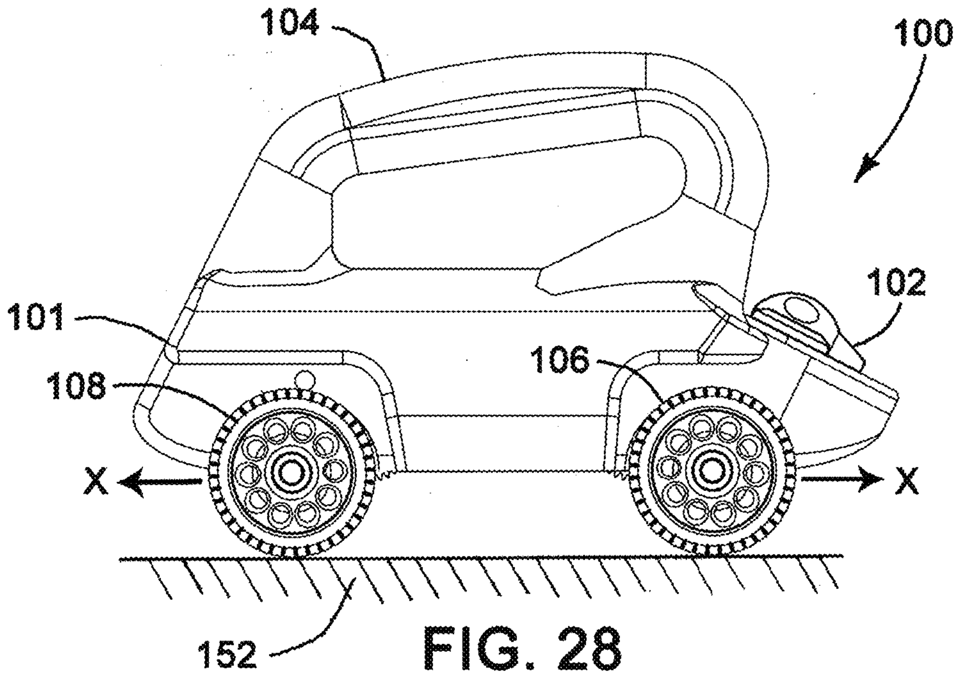
FIG. 28 is a side view of the first embodiment showing the front rollers and rear rollers having moved away from each other to flatten and stretch the skin fold during the second half-cycle.

The compressed regions between the front and rear rollers form "skin folds" as shown in the side elevational view of FIG. 27, where the fascial region is represented by label 152. The skin fold is produced during the "compression" half cycle and then flattened during the stretching half cycle as the rollers separate from each other as shown in FIG. 28. This sequence of cupping and flattening the fascial region is cyclically repeated according to the speed setting desired by the user, as adjusted by control knob 102. At low speed settings, this component of the massage action corresponds to the "kneading" action of the massage therapist in producing Petrissage to create and then flatten "skin folds" as illustrated in FIG. 9. At higher speed settings, the cyclic cupping and flattening sequence replicates the action of Myofascial release as illustrated in FIG. 1 (Prior Art).

The traction of the gripping surface on roller 108 in creating the skin fold (FIG. 27) is aided by the partial torque created within the axle assembly 136 by a slip torque means. To better understand this, three different exploratory cases can be briefly examined using the example of roller 108 in FIG. 27. In the first exploratory case, roller 108 freely spins on its axle. As the user pushes the device along the surface, a small ripple is forced upward in front of the roller as the roller freely rotates. In this case, the roller surface is incapable of providing positive traction against the fascia surface.

Alternatively in a second exploratory case, roller 108 is locked to its axle and rotates with the axle along the axle's orbit. As the user traverses the device, the roller therefore skids along the surface, creating a large ripple in front of the roller resulting from the shearing forces. Since the front and rear rollers rotate oppositely to each other, the axle-locked skidding condition would always be induced in one traversing direction or the other. Such a condition would be an impediment to the freely traversing mode of the device. Furthermore, the skidding condition would require a skin lubricant to be used to reduce the discomfort created by the shearing action.

In a third exploratory case, the roller 108 (FIG. 27) possesses a slip torque means between its rotationally driven axle and the following roller shell. As the axle is rotationally driven, a partial torque is transmitted to the roller in the direction of the arrow, such that the roller 108 provides a finite amount of traction to the fascia surface. The partial traction is more aggressive than the freely spinning roller, but less aggressive than the axle-locked roller condition. Thus, a larger skin fold is created by the slip clutch version than can be created by the freely spinning roller.

Figure 29:
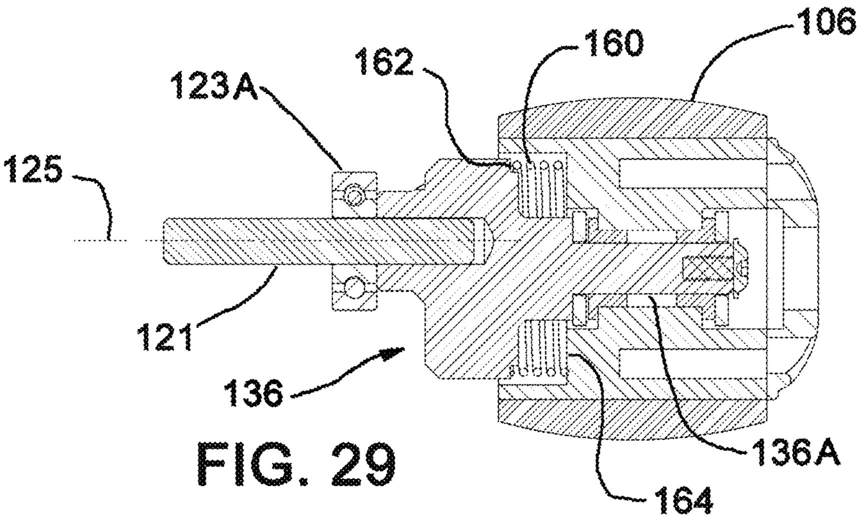
FIG. 29 is a section view of the eccentric axle assembly showing the slip torque means which allows the roller to partially slip upon its axle during its eccentric rotation cycle.

FIG. 29 shows a preferred embodiment where a compression spring is used as a slip clutch. FIG. 29 is a partial sectional view through the center of the axle assembly 136. The compression spring 160 is trapped between the interior wall 164 of the roller and the rotating flange surface 162 of the eccentric axle. As the motor 130 rotates the axle extension 136A, a partial torque is transmitted between the driving axle and the driven roller as the spring slips, such that the roller adds traction to the movement against the fascia. In this way, a more aggressive skin fold is created as compared to a roller that freely rotates upon its axle.

There are many conceivable ways to add a slipping means between the driving axle and driven roller in order to create a slipping friction. Magnets are one obvious solution whereupon a magnet is attached to a roller and a second magnet is attached to the eccentric axle hub. A more eloquent means can be achieved using magnets fixed to the rollers and coupled to electromagnets. Although more costly to manufacture, an operator control means could be added to the device that adjusts the field intensity of the electromagnets. In this way, the operator could adjust the aggressiveness of the skin fold creation.

Amongst the advantages of the first embodiment is its ability to alternately stretch and compress the fascia in adjacent regions 170 and 172 (FIG. 25) along the plane of the fascia surface, while also inducing percussive massage forces perpendicular to the fascia surface.

Figure 30:
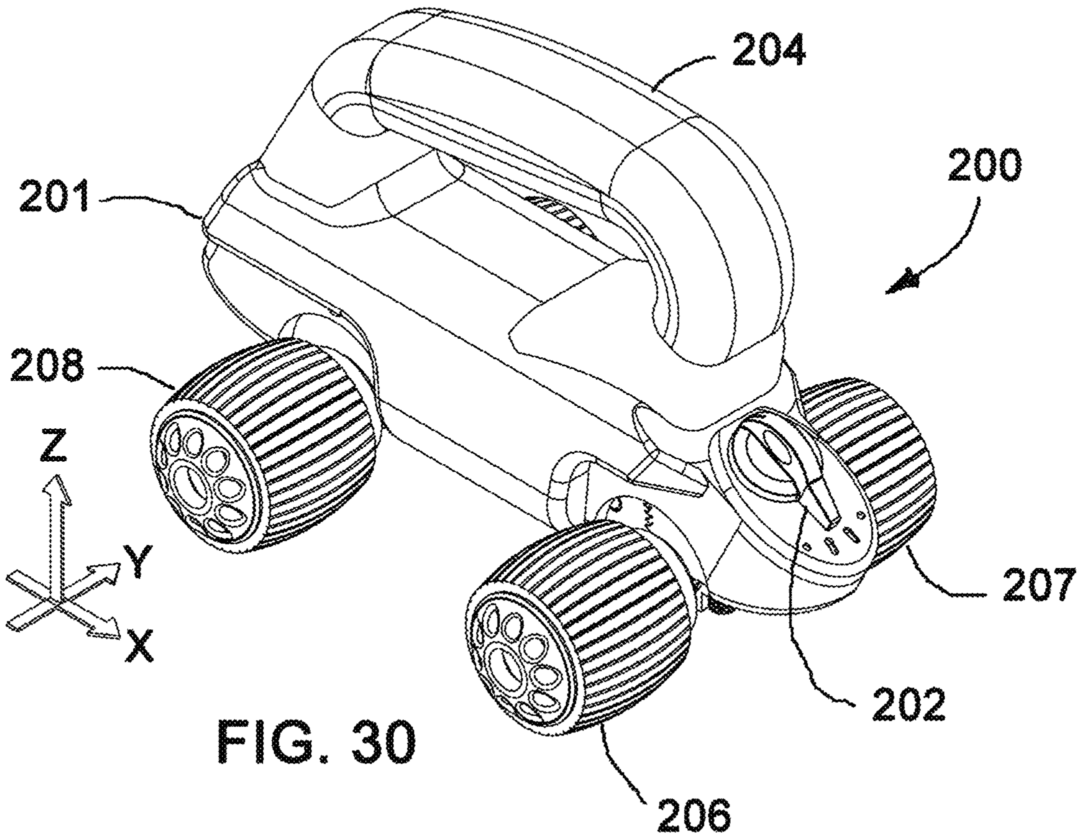
FIG. 30 is an is an isometric view of a second embodiment of the cellulite massage device.

FIG. 30 is an isometric view of a second embodiment of an Anti-Cellulite Massage Device. This embodiment differs from the first embodiment only by the relative orbital phase orientation of the eccentric axles. The device 200 consists of a casing body 201 which includes a handle portion 204. The front rollers 206 and 207 are rotatable upon a first eccentric axle (the front axle) and the rear rollers 208 and 209 (not shown) are rotatable upon second eccentric axle, which is designated herein as the rear eccentric axle. Each of the two axles are rotationally driven by a battery-powered motor. The speed of the eccentric axle motion is controlled by the velocity of a battery-powered drive motor which is mounted internally within the casing 201. The operator controls the motor speed by setting the position of the speed control knob 202. Within FIG. 30, the reference axes X, Y, and Z are shown to orient the vectors showing the multiple directions of the massage forces as further explained below.

Figure 31:
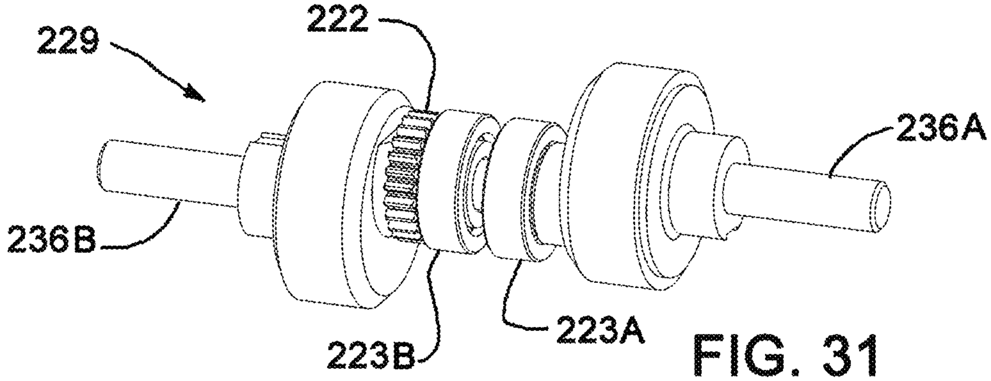
FIG. 31 is an isometric view of one eccentric axle of the second embodiment showing the axle extensions.
Figure 32:
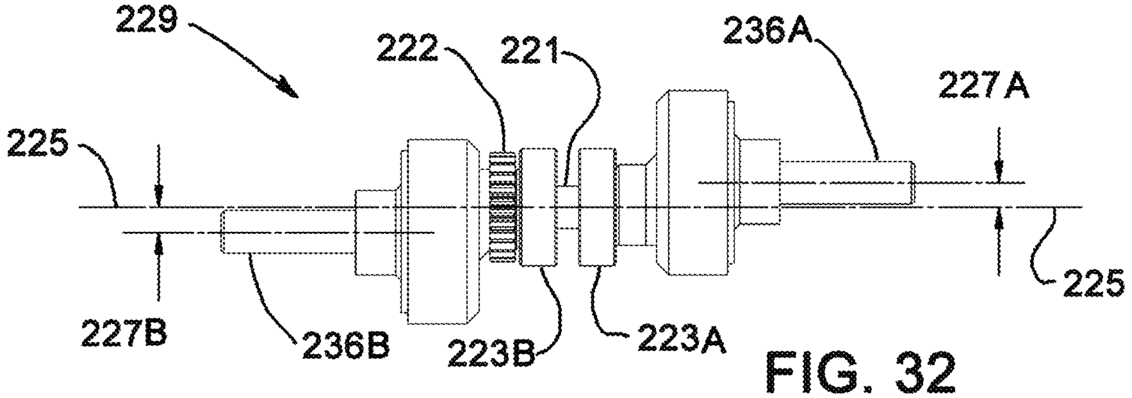
FIG. 32 is a frontal view of one eccentric axle of the second embodiment showing the opposing eccentric offsets of the right and left axles.

An isometric view of the front eccentric axle assembly 229 of device 200 is shown in FIG. 31. As shown in FIG. 31 and FIG. 32, the axle rotates within bearings 223A and 223B about axis 225, as driven by pinion 222 which is fixedly attached to the axle shaft 221. Each peripheral end of the axle assembly 229 possesses an eccentric shaft extension 236A and 236B.

FIG. 32 is a frontal view of the axle assembly 229 showing its rotation axis 225 and the bearings 223A and 223B. The entire assembly 229 rotates about axis 225. An eccentric axle extension 236A is offset from the rotation axis by a dimension 227A, where the dimension 227A is normally designated as the eccentricity (e) in many engineering texts. In this view, the offset 227A is upward from the rotational centerline 225. In like manner, eccentric axle extension 236B is offset from the rotation axis by a dimension 227B. Eccentricity dimensions 227A and 227B are equal and opposite in direction to the rotation axis in the preferred embodiment, but may be made unequal in alternate embodiments.

Figure 33:
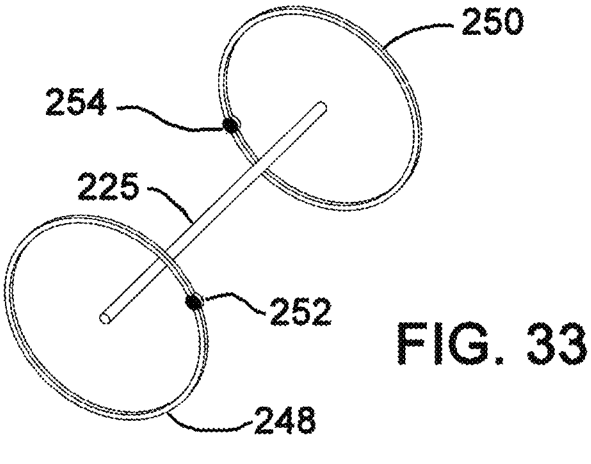
FIG. 33 is a diagram explaining the phase relationship between the right and left axle tips according to the axle configuration of FIG. 32.

FIG. 33 is a diagram explaining the phase relationship between the right and left eccentric axles according to the axle configuration of FIG. 32. The wire represents the rotational axis 225 of the axle as shown in in FIG. 32, while the circles 248 and 250 represent the circular paths (exaggerated) of the axle extensions. Circle 248 represents the loci of the path of the right eccentric axle tip orbit, while circle 250 represents the orbital path of the left axle tip. Label 252 indicates the position of the right axle tip along circular orbit at any given point in time, while 254 represents that of the left axle tip. In this example, the right axle tip 252 is at its 2 o'clock position while the left axle tip 254 is at it its 8 o'clock position. The rotation of the two axle tips is said to be "out of phase" by 180 degrees. Again considering the two circular orbits by the analogy of a clock, the left axle tip is 6 hours ahead of the right axle tip at any given instant in time. However, the embodiments should not be considered as limited to that shown within FIG. 32. Other embodiments could be implemented with phase differences other than 180 degrees.

Figure 34:
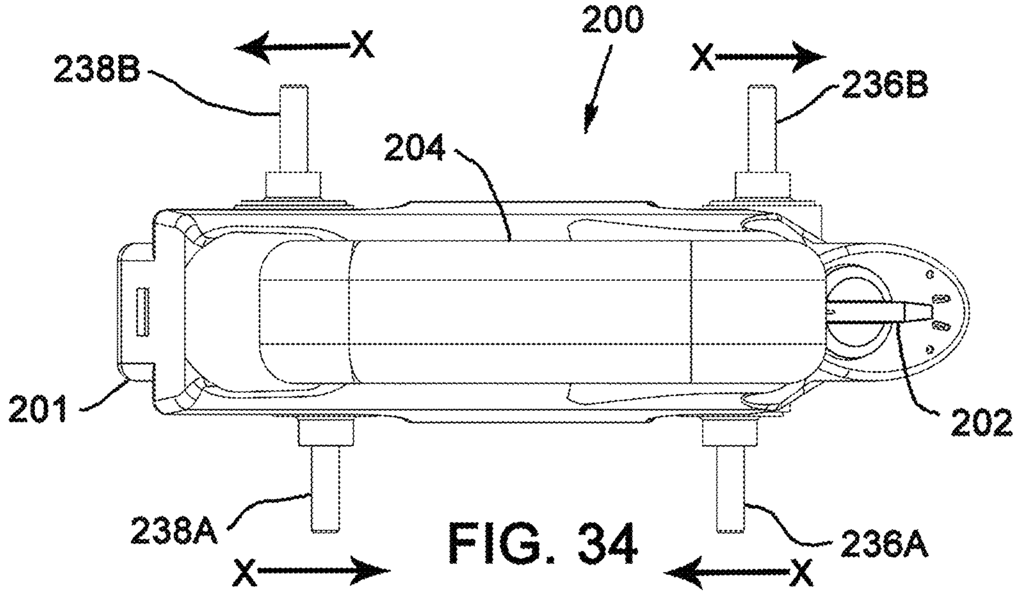
FIG. 34 is a top view of the second embodiment as shown in FIG. 30 with the massage rollers shown at their synchronized extremes along the X-axis.

FIG. 34 illustrates a top view of the massage device 200 with the massage rollers removed from the eccentric axles. Right rear eccentric axle extension 238A and left rear eccentric axle extension 238B are oriented with a phase difference of 180 degrees in the same way as described in FIG. 32. However, the angular orientation of the front and rear axles are set up at assembly to be exactly opposite. In FIG. 34, the left front eccentric axle is located at it' 9 o'clock position while the right rear eccentric axle 238B is at its 3 o'clock position. Also, the synchronizing gear train from the first embodiment (see FIG. 20) is identically utilized in the second embodiment.

In this way, the rotational velocities of the front and rear eccentric axles are identical and their motion is synchronized.

In the illustration of FIG. 34, the left eccentric axle extensions 236B and 238B are located at their farthest extremity along the X-axis. When viewed from above, the X-axis vector arrows indicate that the left axle tips have just moved away from each other as the right axle tips have just moved toward each other. Simultaneously, the right eccentric axle extensions 236A and 238A are located at their closest extremity along the X-axis. Since the velocity of the front and rear axles are synchronized, the condition shown in FIG. 25 will be reversed as the rotation cycle continues for another 180 degrees. During a complete rotation cycle, the left and right axle extension pairs will move together and then separate along the X-axis in alternating cyclic manner according to the motor speed adjustment as set by the user.

Figure 35:
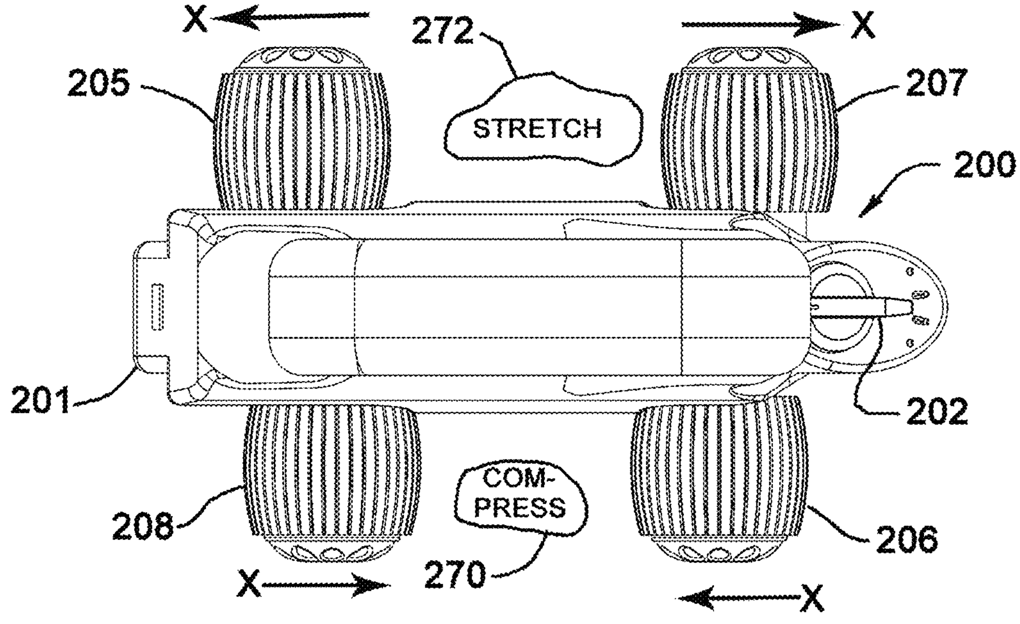
FIG. 35 is the same top view of the second embodiment as shown in FIG. 34, but with the massage rollers shown as positioned upon their axles.

FIG. 35 is a top view of massage device 200 that is identical to FIG. 34, with the exception that the rollers, their bearings, and the slip clutch springs are installed on the eccentric axles. Left front roller 207 is located in its 3 o'clock position and synchronized with the left rear roller 205 when located at its 9 o'clock position. At this point in the rotation cycle, the two left rollers have reached their extreme distance from each other, and have induced a stretching force along the stretching axis in the region between roller 205 and roller 207. The symbol "STRETCH" indicates that the fascia region 272 is stretched as the rollers 205 and 207 separate.

Simultaneously, within FIG. 35 the right rear roller 208 and the right front roller 206 have reached the position in the rotation cycle where they are closest to each other along the X-axis. The symbol "COMPRESS" indicates that the fascia region 270 between roller 208 and roller 206 tends to become compressed as those two rollers move towards each other, thus creating the skin fold.

Figure 36:
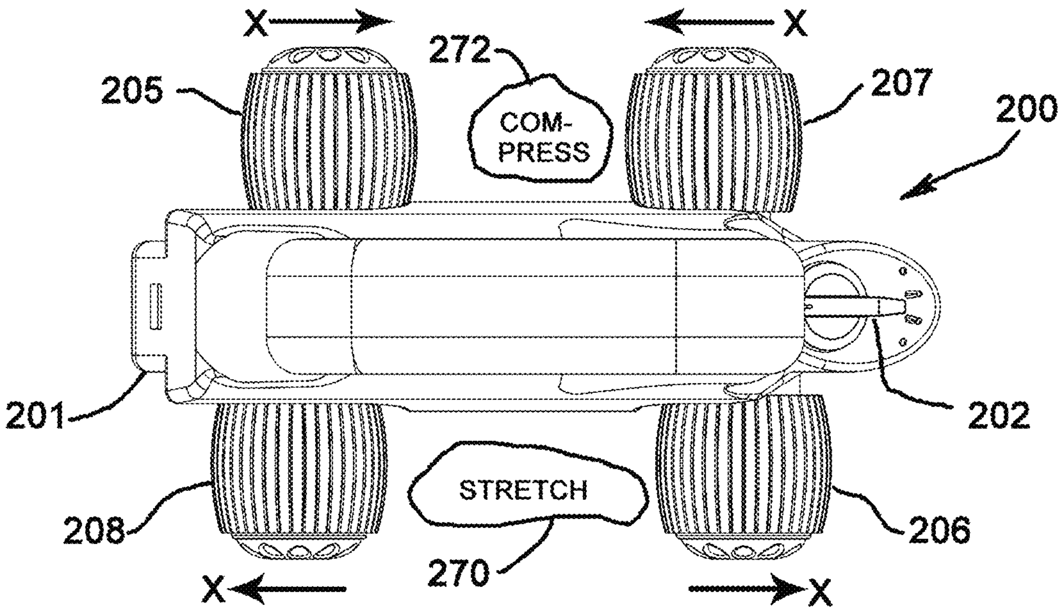
FIG. 36 is the same top view of the second embodiment as shown in FIG. 35, but with the massage rollers shown at the opposite synchronized extremes along the X-axis.

During the successive 180 degree portion of each cycle, the relative motion of the left and right rollers along the X-axis is reversed as shown in FIG. 36. That figure shows a top view of the massage device 200. The position of all eccentric axles is rotated by 180 degrees when compared to FIG. 35, such that front right roller 206 is located at its 3 o'clock position and right rear roller 208 is located at its 9 o'clock position. At this point in the rotation cycle, roller 206 has moved farthest from roller 208 along the X-axis. Simultaneously, the left side rollers 205 and 207 are 180 degrees out of phase, and those two rollers have moved to a position which is closest each other along the X-axis.

FIG. 35 and FIG. 36 together explain that stretching and compression cycles along the surface of the fascia in regions 270 and 272. The stretching and compression cycles are alternatingly reversed from side to side of the device in the massage device 200. These figures can be compared to FIG. 25 and FIG. 26 of the first embodiment (device 100), where the stretching and compression cycles induced by the left and right rollers did not alternately reverse from side to side.

Amongst the advantages of the second embodiment device 200 is its ability to simultaneously stretch and compress the fascia in adjacent regions 270 and 272 (FIG. 35) along the plane of the fascia surface, while also inducing percussive massage forces perpendicular to the fascia surface.

Other variations of the massage device may be apparent to those of ordinary skill. For example, a second drive motor could be utilized in the first and second embodiments such that the synchronizing gears 140A, 140B, 140C and 140D could be eliminated. In that variant, the electronic controller is utilized to synchronize the phase of each motor, such that the same 2-dimensional massage force vectors are induced as were explained above. Alternatively, a synchronous tooth belt could be substituted for some of the synchronizing gears. Further, a version of the devices 100\200 intended to reduce manufacturing cost could be implemented by eliminating the operator speed control and associated electronic components. Another lower cost alternative could be achieved by eliminating the battery pack and adopting an AC-driven motor.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A handheld, self-powered traversable massage device having a first non-traversing mode and a second traversing mode comprising;
- a casing including a handle portion;
- a rechargeable battery pack;
- one unidirectional motor;
- an operator-adjustable motor speed control;
- an operator-controlled activation switch;
- four spherical rollers having a gripping surface;
- a first spherical roller and a third spherical roller oriented external to the casing on the casing's right peripheral side and comprising a right roller pair;
- a second spherical roller and a fourth spherical roller oriented external to the casing on the casing's left peripheral side and comprising a left roller pair;

the first spherical roller and the second spherical roller comprising the front rollers:

the third spherical roller and the fourth spherical roller comprising the rear rollers;

each spherical roller having an axle that is rigidly adjoined to, and noncoincident with one of a first and second motor-driven axle;

the axle of the first spherical roller and the axle of the second spherical roller each eccentrically offset from, and parallel to the first motor-driven axle while orbiting continuously about the axis of the first motor-driven axle;

the axle of the third spherical roller and the axle of the fourth spherical roller each eccentrically offset from, and parallel to the second motor-driven axle while orbiting continuously about the axis of the second motor-driven axle;

each of the roller axles having a roller axle orbit comprised of a 360-degree excursion along a circular path whose radius corresponds to the eccentric offset, and whose axis lies coincident with the rotation axis of its motor-driven axle;

each spherical roller configured to have an outer surface in continuous rolling contact with an independent area of the fascia during each roller orbit while the device is positioned stationary in the first non-traversing mode;

each of the spherical rollers being uncoupled from its axle through a slip clutch and able to independently rotate about its own axle bidirectionally;

a first fascia region comprising a region between and surrounding a contact solely with the right roller pair;

a second fascia region comprising a region between and surrounding a contact solely with the left roller pair;

the motor-driven axles being angularly phased such that center distance between the right roller pair and the center distance between the left roller pair each expand and contract cyclically as the motor continuously rotates unidirectionally;

the expanding and contracting center distance between each roller pair configured to produce continuously reciprocating stretching and compression forces along the surface of the fascia within the first and second fascia regions;

the axle orbits of the each of the spherical roller pairs additionally producing continuous reciprocating oscillation of each roller in the direction perpendicular to the first and second fascia regions;

the unidirectional motor continuously producing two-dimensional rolling contact forces within each of the first fascia region and the second fascia region comprising: (i) continuous reciprocating roller motion perpendicular to the fascia surface resulting in percussive massage forces, and (ii) continuous reciprocating roller motion parallel to the fascia surface resulting in alternating stretching and compression massage forces, simultaneously while the device is positioned stationary in the first non-traversing mode;

wherein the reciprocating roller motion upon the first fascia region is synchronized with oppositely directed reciprocating roller motion upon the second fascia region while the device is positioned stationary in the first non-traversing mode.

2. The massage device of claim 1, whereupon the front rollers rotate synchronously in parallel planes upon separate axles whose axes remain coincident throughout their orbits.

3. The massage device of claim 1 whereupon the rear rollers rotate synchronously in parallel planes, upon separate axles whose axes remain coincident throughout their orbits.

4. The massage device of claim 1 wherein the rotational velocity of the first-motor-driven axle is the same as the rotational velocity of the second motor-driven axle.

5. The massage device of claim 1 whereupon the first motor-driven axle and the second motor-driven axle are driven in opposing directions by the same unidirectional motor.

6. The massage device of claim 1 whereupon synchronizing gears are used to synchronize the motion of the second motor-driven axle in respect to the rotation of the first motor-driven axle.

7. The massage device of claim 1 whereupon the second motor-driven axle synchronously counter-rotates relative to the first motor-driven axle.

8. The massage device of claim 1 whereupon the 3 o'clock orbit position of the first orbiting spherical roller is synchronized to the 9 o'clock orbit position of the fourth orbiting spherical roller to induce a stretching force along the surface of the fascia.

9. The massage device of claim 1 whereupon the rotational velocity of the first motor-driven axle is different than the rotational velocity of the second motor-driven axle.

10. The message device of claim 1 whereupon the first motor-driven axle is driven by a first continuously rotating motor, and the second motor-driven axle is driven by a second continuously rotating motor.

11. The massage device of claim 1 whereupon the device may operate from a stationary position in a first non-traversing mode, or be traversed along the fascia surface receiving the reciprocating contact forces in a second operational mode, while providing non-abrasive rolling contact with the fascia.

12. A method of utilizing opposing pairs of synchronized eccentrically-mounted spherical rollers to induce oppositely-directed alternating cycles of stretching and compression of fascia simultaneously within two separated facia regions with one unidirectional motor;

the method comprising the steps of grasping the handle portion of the massage device of claim 1, adjusting the speed control, positioning the device upon a target fascia area, depressing the activation switch, and applying mild pressure while holding the device steady.

* * * * *